(12) United States Patent
Belser

(10) Patent No.: US 6,703,099 B2
(45) Date of Patent: Mar. 9, 2004

(54) PERPENDICULAR MAGNETIC RECORDING MEDIA WITH PATTERNED SOFT MAGNETIC UNDERLAYER

(75) Inventor: Karl Arnold Belser, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 201 days.

(21) Appl. No.: 09/917,115

(22) Filed: Jul. 27, 2001

(65) Prior Publication Data

US 2002/0071214 A1 Jun. 13, 2002

Related U.S. Application Data

(60) Provisional application No. 60/221,500, filed on Jul. 27, 2000.

(51) Int. Cl.⁷ .................... B32B 15/04; G11B 5/62; G11B 5/66; G11B 5/667
(52) U.S. Cl. ............... 428/64.2; 428/65.3; 428/694 T; 428/694 TS; 428/694 TR; 428/694 TM
(58) Field of Search ............... 428/692, 694 T, 428/694 TS, 694 TR, 694 TM, 694 ST, 694 SG, 64.2, 65.3; 360/77.01, 77.07, 131, 135; 369/272, 275.3, 277, 278

(56) References Cited

U.S. PATENT DOCUMENTS

| 4,546,398 A | 10/1985 | Toda et al. |
| 4,735,840 A | 4/1988 | Hedgcoth |
| 4,974,110 A | 11/1990 | Kanamine et al. |
| RE33,949 E | 6/1992 | Mallary et al. |
| 5,241,520 A | 8/1993 | Ohta et al. |
| 5,399,372 A | 3/1995 | Grimes et al. |
| 5,518,804 A * | 5/1996 | Mizuno et al. ............ 428/212 |
| 5,543,221 A * | 8/1996 | Kitakimi et al. ........... 428/332 |
| 5,589,262 A | 12/1996 | Kiuchi et al. |
| 5,615,205 A | 3/1997 | Belser |
| 5,635,267 A | 6/1997 | Yamada et al. |
| 5,703,733 A * | 12/1997 | Suzuki et al. ............ 360/77.01 |
| 5,889,641 A | 3/1999 | Belser et al. |
| 5,942,342 A | 8/1999 | Hikosaka et al. |
| 5,986,978 A | 11/1999 | Rottmayer et al. |
| 5,999,512 A | 12/1999 | Furuta |
| 6,042,927 A | 3/2000 | Uchiyama et al. |
| 6,248,416 B1 | 6/2001 | Lambeth et al. |
| 6,261,681 B1 | 7/2001 | Suekane et al. |
| 6,264,848 B1 | 7/2001 | Belser et al. |
| 6,270,885 B1 | 8/2001 | Hokkyo et al. |
| 6,277,484 B1 | 8/2001 | Shimoda et al. |
| 6,387,483 B1 | 5/2002 | Hokkyo et al. |
| 6,403,240 B1 | 6/2002 | Kanbe et al. |
| 6,411,459 B1 | 6/2002 | Belser et al. |
| 6,421,313 B1 | 7/2002 | Belser |
| 6,462,916 B1 | 10/2002 | Hokkyo |
| 6,531,202 B1 * | 3/2003 | Litvino et al. ............ 428/65.3 |
| 2001/0045005 A1 | 11/2001 | Dugas |

FOREIGN PATENT DOCUMENTS

JP 04-176021 * 6/1992

OTHER PUBLICATIONS

U.S. patent application Ser. No. 09/280,414, Belser et al., filed Mar. 29, 1999.
U.S. patent application Ser. No. 09/724,112, Litvinov et al., filed Nov. 28, 2000.
U.S. patent application Ser. No. 09/760,229, Khizroev et al., filed Dec. 12, 2002.

* cited by examiner

Primary Examiner—Paul Thibodeau
Assistant Examiner—Nikolas J Uhlir
(74) Attorney, Agent, or Firm—Alan G. Towner, Esq.; Pietragallo, Bosick & Gordon

(57) ABSTRACT

A perpendicular magnetic recording media with a patterned soft magnetic underlayer is disclosed. The recording media may be a disk including a substrate, a patterned underlayer, and a magnetically hard recording layer. The underlayer may be provided in the form of concentric bands having widths less than the track widths of the recording layer. The patterned underlayer reduces or eliminates adjacent track interference.

16 Claims, 3 Drawing Sheets

PERPENDICULAR MAGNETIC RECORDING MEDIA WITH PATTERNED SOFT MAGNETIC UNDERLAYER

CROSS REFERENCE TO RELATED APPLICATION

This application claims the benefit of U.S. Provisional Patent Application Serial No. 60/221,500 filed Jul. 27, 2000.

FIELD OF THE INVENTION

The present invention relates to magnetic recording media, and more particularly relates to perpendicular magnetic recording media having a patterned soft magnetic underlayer that reduces intersymbol and adjacent track interference.

BACKGROUND INFORMATION

Perpendicular magnetic recording systems have been developed for use in computer hard disk drives. A typical perpendicular recording head includes a trailing write pole, a leading return or opposing pole magnetically coupled to the write pole, and an electrically conductive magnetizing coil surrounding the yoke of the write pole. The bottom of the opposing pole has a surface area greatly exceeding the surface area of the tip of the write pole.

Conventional perpendicular recording media typically include a hard magnetic recording layer and a soft magnetic underlayer which provide a flux path from the trailing write pole to the leading opposing pole of the writer. To write to the magnetic recording media, the recording head is separated from the magnetic recording media by a distance known as the flying height. The magnetic recording media is moved past the recording head so that the recording head follows the tracks of the magnetic recording media, with the magnetic recording media first passing under the opposing pole and then passing under the write pole. Current is passed through the coil to create magnetic flux within the write pole. The magnetic flux passes from the write pole tip, through the hard magnetic recording track, into the soft underlayer, and across to the opposing pole.

Perpendicular recording designs have the potential to support much higher linear densities than conventional longitudinal designs, especially when a bilayer perpendicular media with a soft magnetic underlayer is used. Magnetization transitions on the bilayer recording disk are recorded by a trailing edge of the trailing pole and reproduce the shape of the trailing pole projection on the media plane. However, due to the change in skew angle as the recording head travels in an arc across the disk and possible misalignment of the write pole, this can result in unwanted side writing when a rectangular shaped write pole is used.

The underlayer used in perpendicular magnetic recording causes relative long-range intersymbol interference, both along the track and from track to track. The intersymbol interference effects are caused by a data dependent changes in the length of the magnetic return path from the reader through the underlayer and back through a much larger return pole area. For example, if the vertical domain orientation of the previously recorded data bits and the data bits on the adjacent tracks are all in the same direction as the data bit being read, then the surrounding domains may impede the flow of flux through the larger return pole. In this case, the sensed field by the reader would be lower in amplitude. This intersymbol and adjacent track interference may be a problem with traditional high density PRML recording codes and hence should be controlled.

One way to minimize the return path effect is to use a DC balanced code in which the number of up-pointing domains and the number of down-pointing domains are equal over some short distance such as 32 bits. This type of code is customarily used in CD recording. An example is the eight of fourteen modulation (EFM) code which uses 14 bits to encode a byte of data and another 3 bits to cause the code to be DC balanced. Such a code would make the magnetic data DC balanced over a 1 micron circle if the channel bit length were say 60 nm. The problem with DC balanced codes is that they result in a lower effective bit density as compared with PRML codes.

Unfortunately, DC balancing in the radial direction cannot adequately be addressed. The encoding can be DC balanced within a data record. However, the adjacent track spacing, the location of the gaps between data records, and the old information between tracks and in the gaps are not well controlled. For example, there is little side erasing in perpendicular recording. Hence, if the 6-sigma TMR is 30 percent of the track pitch, there will be large areas of old information that will cause the readback signals to be distorted even though the read back head does not pass directly over this data.

If the recording films are removed or made magnetically dead, e.g., by ion implantation between the tracks, the old information between tracks will be reduced. Further, if the recording films are removed or made dead where the inter-record gaps will occur, the old information interference from the gap will be reduced. The problem with removing the films is that one is left with a surface topology that may affect the ability of the recording head to fly on the surface. These known options require processing of an otherwise finished disk in order to apply the pattern. Therefore, there is a risk that the magnetic properties of the recording films or the flyability of the surface will be adversely affected.

A need therefore exists to pattern the substrate before the films are added in such a way that neither the magnetic properties of the recording films or the flyability of the surface are adversely affected. The present invention has been developed in view of the foregoing.

SUMMARY OF THE INVENTION

An aspect of the present invention is to provide a perpendicular magnetic recording media including means for reducing intersymbol interference between adjacent tracks of a magnetically hard recording layer of the recording media.

Another aspect of the present invention is to provide a perpendicular magnetic recording media comprising a substrate, a patterned magnetically soft underlayer on the substrate, and a magnetically hard recording layer over the patterned underlayer, wherein the patterned underlayer comprises discontinuities between adjacent tracks of the recording layer.

A further aspect of the present invention is to provide a method of making a perpendicular magnetic recording media. The method comprises the steps of providing a substrate, providing a patterned magnetically soft underlayer on the substrate, and depositing a magnetically hard recording layer over the patterned underlayer, wherein the patterned underlayer comprises discontinuities between adjacent tracks of the recording layer.

These and other aspects of the present invention will be more apparent from the following description.

DETAILED DESCRIPTION

Figure 1:
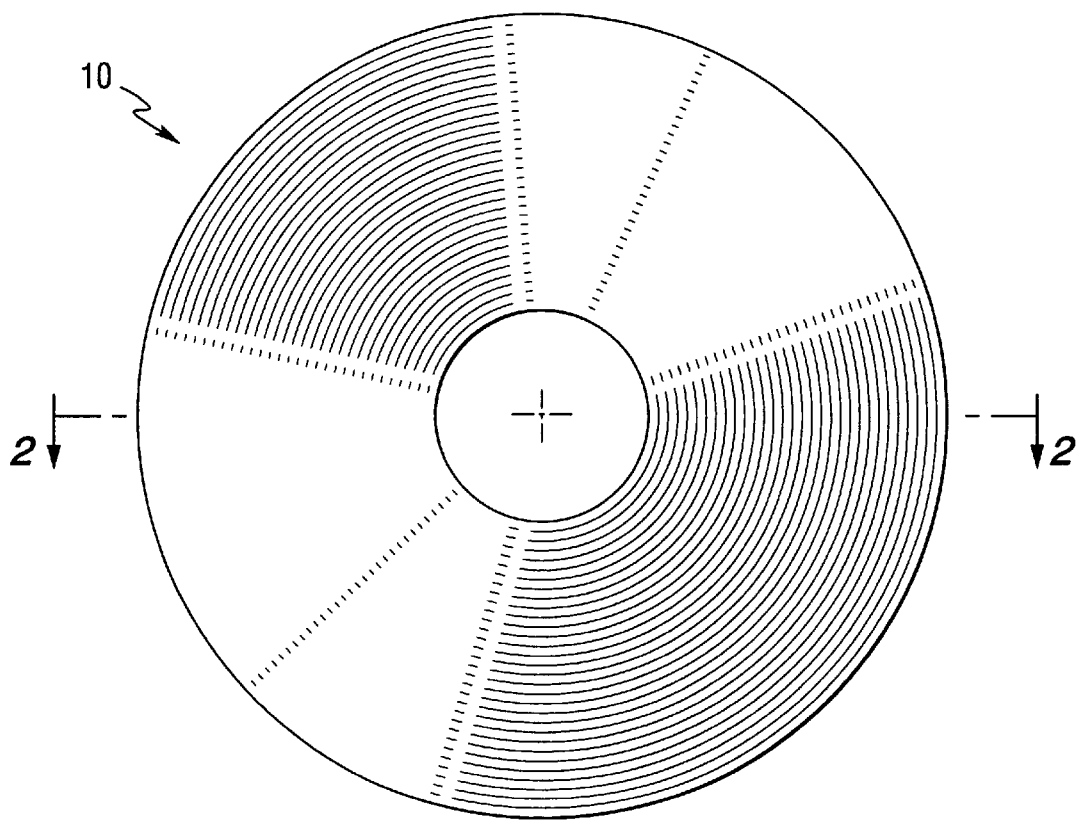
FIG. 1 is a top view of a perpendicular magnetic recording disk which includes a patterned soft magnetic underlayer in accordance with an embodiment of the present invention.
Figure 2:
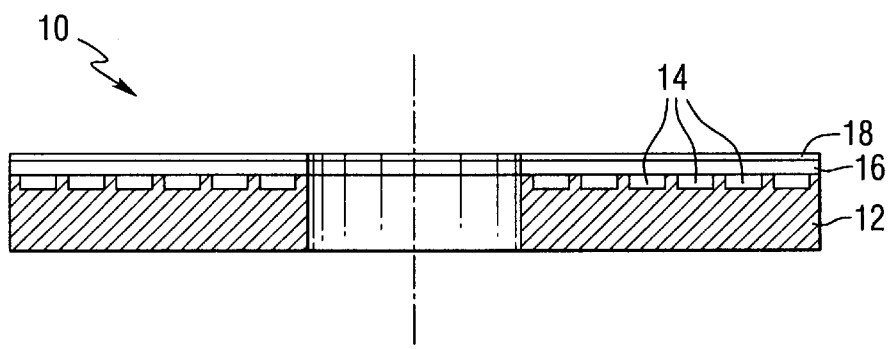
FIG. 2 is a partially schematic side sectional view of the perpendicular magnetic recording disk taken through section 2—2 of FIG. 1.

FIG. 1 is a top view and FIG. 2 is a side sectional view of a magnetic recording disk 10 in accordance with an embodiment of the present invention. For purposes of illustration, the components of the magnetic recording disk 10 shown in FIG. 2 are not drawn to scale. The magnetic recording disk 10 includes a substrate 12 which may be made of any suitable material such as ceramic glass, amorphous glass, aluminum or NiP plated AlMg.

As shown in FIG. 2, patterned magnetically soft underlayer 14 is deposited in grooves on the surface of the substrate 12, thereby forming concentric bands of the underlayer material. The bands may be continuous or discontinuous. Suitable soft magnetic materials for the patterned underlayer 14 include CoFe and alloys thereof, FeAlN, NiFe, CoZrNb and FeTaN, with CoFe and FeAlN being typical soft materials. A magnetically hard recording layer 16 is deposited over the patterned soft underlayer 14. Suitable hard magnetic materials for the recording layer 16 include multi-layers of Co/Pd or Co/Pt, L10 phases of CoPt, FePt, CoPd and FePd and hcp Co alloys, with such multi-layers and L10 phases being typical hard materials. The recording layer 16 and soft underlayer 14 may have any desired thickness, e.g., from 5 to 50 nanometers. A thin protective overcoat 18 such as diamond-like carbon may be applied over the recording layer 16.

FIGS. 3a–3h are side sectional views illustrating various fabrication steps for making a perpendicular magnetic recording media with a patterned soft underlayer in accordance with an embodiment of the present invention.

Figure 3A:
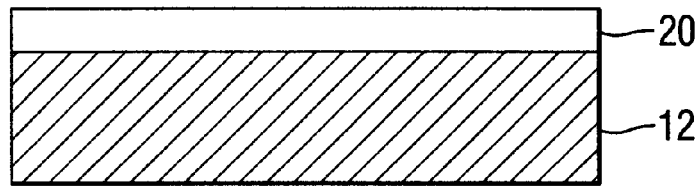
FIGS. 3a–3h are side sectional views of a portion of a magnetic recording disk, illustrating fabrication steps for making a patterned soft magnetic underlayer in accordance with an embodiment of the present invention.
Figure 3B:
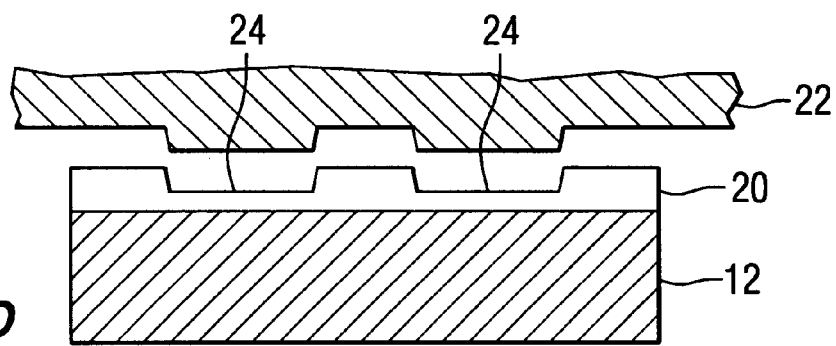

As shown in FIG. 3a, a standard resist layer 20 is deposited over the substrate 12. A stamper 22 is then pressed into the surface of the resist layer 20 in order to transfer a format pattern from the surface of the stamper 20 into the surface of the resist layer 20, as illustrated in FIG. 3b. When the stamper 22 is removed, portions of the resist layer are compressed 24.

Figure 3C:
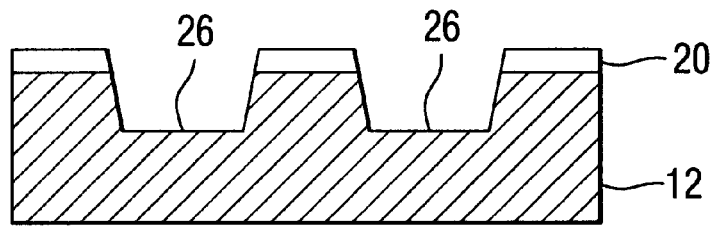

As shown in FIG. 3c, the resist layer 20 is then etched using standard techniques until the compressed portions 24 of the resist layer 20 are etched away and the underlying substrate 12 is exposed. The etching process continues and portions of the substrate 12 are removed until a desired etch depth is reached in order to form grooves 26 in the substrate 12. It is important to make sure there is sufficient amount of resist 20 on the surface of the substrate 12, so that only the portions of the substrate 12 that should be etched are etched. The etch depth is determined by the desired thickness of the patterned soft underlayer. In this exemplary embodiment, an etch depth of 5 to 50 nanometers is typically used.

Figure 3D:
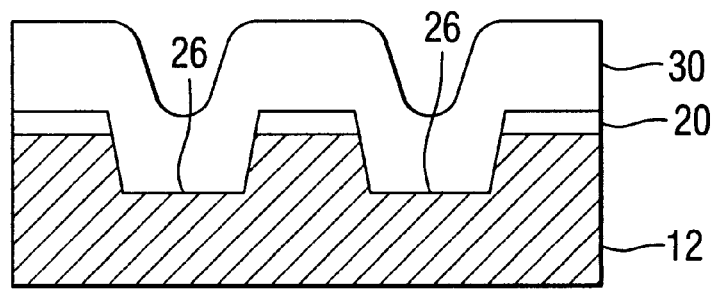
Figure 3E:
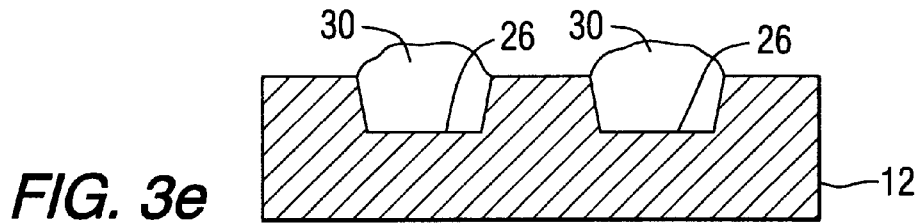

As shown in FIG. 3d, a layer of soft magnetic material 30 is deposited by standard deposition techniques on the substrate 12 and photoresist layer 20, filling the grooves 26. The photoresist layer 20 is then etched away from the substrate 12, as shown in FIG. 3e. During this etching process, the portion of the soft magnetic material 30 covering the photoresist layer 20 is also removed, leaving the portions of the soft magnetic material 30 filling the grooves 26.

Figure 3F:
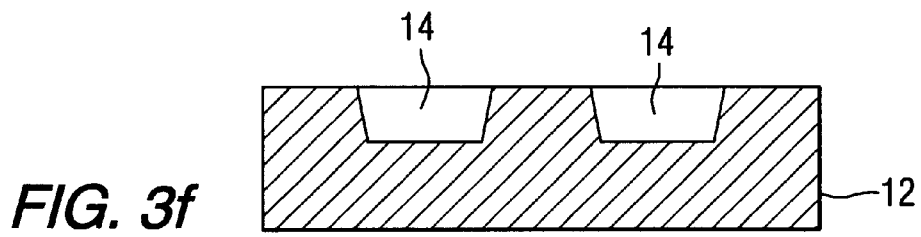

As shown in FIG. 3f, the deposited soft magnetic material 30 has been polished down to the level of the substrate 12. Standard techniques such as chemical mechanical polishing may be used.

Figure 3G:
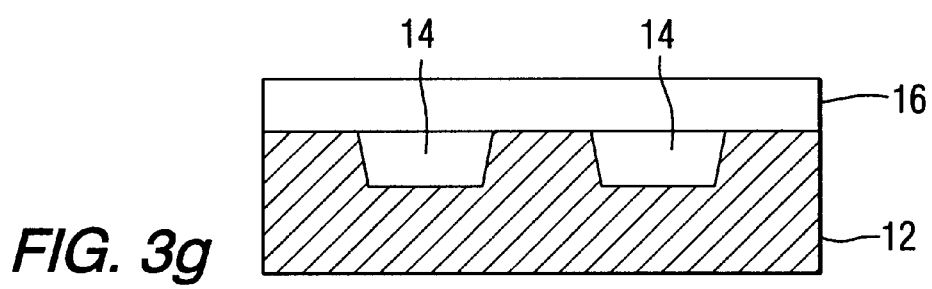

In FIG. 3g, the hard magnetic recording layer 16 is deposited using standard techniques over the substrate 12 and patterned soft underlayer 14. The protective layer 18 is then deposited on the hard magnetic recording layer 16.

Figure 3H:
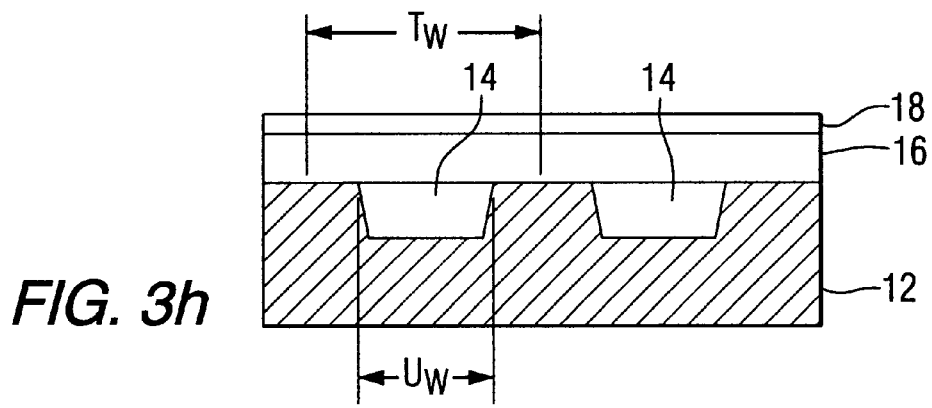

As shown in FIG. 3h, the hard magnetic recording layer 16 has a track width $T_W$. Each band of the patterned underlayer 14 has a width $U_W$. In accordance with the present invention, the track width $T_W$ is greater than or equal to the underlayer band width $U_W$. For example, the underlayer band width $U_W$ may be from about 70 to about 95 percent of the track width $T_W$, typically from about 80 to about 90 percent. For many types of perpendicular magnetic recording media, the track width $T_W$ typically ranges from about 30 to about 200 nanometers.

Alternatively, the structure shown in FIG. 3c may subsequently be processed as follows. The resist layer 20 is removed and the underlayer 14 is deposited over the etched substrate 12. After chemical mechanical polishing, the recording layer 16 is deposited over the patterned underlayer 14 to form a structure as shown in FIG. 3g.

In accordance with an embodiment of the present invention, the underlayer is located in the region in the middle of the track, with no underlayer in the region between tracks or in the gaps between the data records. A typical procedure is as follows:

1) Apply a thin, uniform coating of resist to the surface of the disk substrate.
2) Use either photo lithography or imprint lithography to make a pattern of pits or grooves in the resist.
3) Develop the photo resist or lightly etch the imprinted resist to open up holes where the substrate is to be etched.
4) Use reactive ion etching to make pits or grooves in the substrate that have the desired depth of the underlayer. In some cases the depth will be greater than the width of the pits or grooves.
5) Deposit the desired underlayer material on the substrate before the resist is removed such that the pits are filled or a little overfilled.
6) Remove the photo resist by a lift off process which will leave a relatively ragged surface.
7) Chemically mechanically polish the disk to remove the underlayer down to the level of the substrate. The result should be a flat substrate and underlayer that meets the required flatness specification.

There is an alternate process after step 4, namely remove the resist, deposit the underlayer, and then chemically mechanically polish down to the substrate. However, this process may not be preferred because it could take a long time to remove the unwanted underlayer material.

The embodiment shown in FIGS. 2 and 3 thus provides a patterned substrate which provides the pattern for the underlayer. Alternatively, elevated mesas of soft magnetic material may be provided on a substantially flat substrate surface in order to form the patterned underlayer. In either case, the patterned underlayer comprises discontinuities between adjacent tracks of the recording layer.

The initial magnetization of the films may be achieved as follows. The patterned underlayer will tend to locate the recorded bit so that they are directly over the underlayer because the recording head will be selectively imaged in the underlayer. If the coercivity of the recording layer were high enough, then the regions between the tracks would not be recorded. They would retain their previously magnetized state.

The region between tracks could be DC erased in order to minimize noise. However, the large domain between tracks may cause positive and negative data signal asymmetry when erased in the same direction. A solution to achieve symmetry would be to erase every other band between tracks up and down alternately. Then on the average the readback head would see a zero DC component from the track edges plus the data to be read. One would want to erase the gaps between data records in a similar manner so that the outer half of the gap is magnetized in the opposite direction as the inner half. The recording head may have to have two recording levels, a high level that is capable of erasure when there is no underlayer and a lower level that will not erase or record on the films without an underlayer. It is preferable that either the tip of the recording pole is trimmed or the long pole of the recording head is lined up with the track to prevent side writing of the adjacent track.

The intersymbol interference from reading will now be dominated by adjacent bits along the track. Filtering can compensate for this intersymbol interference. The filtering may be done prior to supplying the data to the read back channel. In this case, DC balanced codes may not have to be used.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording media comprising:
   a substrate, a magnetically soft underlayer on the substrate, and a magnetically hard recording layer over the underlayer; and
   means for reducing intersymbol interference between adjacent tracks of the magnetically hard recording layer comprising discontinuities in the underlayer between adjacent tracks of the recording layer, wherein the discontinuities comprise elevated portions of the substrate.

2. The perpendicular magnetic recording media of claim 1, wherein the elevated portions of the substrate comprise concentric rings that are located between concentric rings of the underlayer.

3. A perpendicular magnetic recording media comprising:
   a substrate;
   a patterned magnetically soft underlayer on the substrate; and
   a magnetically hard recording layer over the patterned underlayer, wherein the patterned underlayer comprises discontinuities between adjacent tracks of the recording layer, wherein the discontinuities comprise elevated portions of the substrate.

4. The perpendicular magnetic recording media of claim 3, wherein the elevated portions of the substrate comprise concentric rings that are located between concentric rings of the underlayer.

5. The perpendicular magnetic recording media of claim 3, wherein the pattern underlayer comprises concentric bands.

6. The perpendicular magnetic recording media of claim 5, wherein each underlayer band is continuous.

7. The perpendicular magnetic recording media of claim 5, wherein the underlayer bands have widths less than or equal to widths of the tracks of the recording layer.

8. The perpendicular magnetic recording media of claim 7, wherein the widths of the underlayer bands are from about 70 to about 95 percent of the widths of the tracks of the recording layer.

9. The perpendicular magnetic recording media of claim 7, wherein the widths of the underlayer bands are from about 80 to about 90 percent of the widths of the tracks of the recording layer.

10. The perpendicular magnetic recording media of claim 5, wherein the widths of the tracks of the recording layer are from about 30 to about 200 nanometers.

11. The perpendicular magnetic recording media of claim 5, wherein the underlayer bands have thicknesses of from about 5 to about 50 nanometers.

12. A method of making a perpendicular magnetic recording media, the method comprising the steps of:
   providing a substrate comprising grooves;
   providing a patterned magnetically soft underlayer on the substrate by at least partially filling the grooves with the magnetically soft underlayer; and
   depositing a magnetically hard recording layer over the patterned underlayer, wherein the patterned underlayer comprises discontinuities between adjacent tracks of the recording layer.

13. The method of claim 12, wherein the patterned underlayer comprises concentric bands.

14. The method of claim 13, wherein the concentric bands of the underlayer are at least partially embedded in the substrate.

15. The method of claim 13, wherein each underlayer band is continuous.

16. The method of claim 13, wherein the underlayer bands have widths less than or equal to widths of the tracks of the recording layer.

* * * * *

UNITED STATES PATENT AND TRADEMARK OFFICE
CERTIFICATE OF CORRECTION

PATENT NO. : 6,703,099 B2
DATED : March 9, 2004
INVENTOR(S) : Karl Arnold Belser It is certified that error appears in the above-identified patent and that said Letters Patent is hereby corrected as shown below:

<u>Title page,</u>
Item [56], References Cited, U.S. PATENT DOCUMENTS, after "6,531,202 B1", "Litvino et al." should read -- Litvinov et al. --.

<u>Column 4,</u>
Line 10, after "width", "$U_w$may" should read -- $U_w$ may --.

Signed and Sealed this

Sixteenth Day of May, 2006

JON W. DUDAS
*Director of the United States Patent and Trademark Office*